US012597142B2

(12) United States Patent (10) Patent No.: US 12,597,142 B2
Ahmed et al. (45) Date of Patent: Apr. 7, 2026

(54) SYSTEMS AND METHODS FOR PREPROCESSING IMMUNOCYTOCHEMISTRY IMAGES FOR MACHINE LEARNING IMAGE-TO-IMAGE TRANSLATION

(71) Applicant: City University of Hong Kong, Hong Kong (CN)

(72) Inventors: Irfan Ahmed, Hong Kong (CN); Condon Lau, Hong Kong (CN); Fraser Hill, Hong Kong (CN); Wei Zhang, Hong Kong (CN); Xinyue Li, Hong Kong (CN); Duncan Hockley, Hong Kong (CN); Wah Cheuk, Hong Kong (CN); Tin Yan Elaine Cheung, Hong Kong (CN); Chi Shing Cho, Hong Kong (CN); Wing Lun Law, Hong Kong (CN); Antonio Giuliano, Hong Kong (CN); Daniela Hernandez Muguiro, Hong Kong (CN); Yixuan Yuan, Hong Kong (CN); Cheuk Ying Cherry Chan, Hong Kong (CN); Wing Sze Kee, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 434 days.

(21) Appl. No.: 18/480,653

(22) Filed: Oct. 4, 2023

(65) Prior Publication Data

US 2025/0117944 A1 Apr. 10, 2025

(51) Int. Cl.
*G06T 7/11* (2017.01)
*G06T 7/00* (2017.01)

(52) U.S. Cl.
CPC .............. *G06T 7/11* (2017.01); *G06T 7/0012* (2013.01); *G06T 2207/20132* (2013.01); *G06T 2207/30024* (2013.01)

(58) Field of Classification Search
None
See application file for complete search history.

(56) References Cited

U.S. PATENT DOCUMENTS

2023/0281749 A1* 9/2023 Fedorov .................... G06T 1/60
345/543

OTHER PUBLICATIONS

"Regionprops." Measure Properties of Image Regions—MATLAB, Feb. 16, 2022, web.archive.org/web/20220216043427/https://www.mathworks.com/help/images/ref/regionprops.html. (Year: 2022).*

(Continued)

*Primary Examiner* — Samah A Beg
(74) *Attorney, Agent, or Firm* — S&F/WEHRW

(57) ABSTRACT

Methods and systems for pre-processing immunocytochemistry images for machine learning are provided. The pre-processing method includes receiving paired positive and negative multi-protein images and segmenting stains of the paired multi-protein images. The method also includes labelling each image pixel corresponding to a cell of the paired multi-protein images and translating image pixel information of the labelled image pixels to tabular form to generate a table of cell coordinates and geometrical characteristics for each of the paired multi-protein images. The method further includes generating two cell-paired tables for each of the paired multi-protein images based on Euclidean distance-based pairing prior to input for the machine learning, where the Euclidean distance-based pairing is based on the cell coordinates in the table of cell coordinates and geometrical characteristics for each of the paired multi-protein images.

20 Claims, 7 Drawing Sheets

100

(56) References Cited

OTHER PUBLICATIONS

Schmidt, Uwe, et al. "Cell detection with star-convex polygons." International conference on medical image computing and computer-assisted intervention. Cham: Springer International Publishing, 2018. (Year: 2018).*

Ahmed, Irfan, et al. "AI-based virtual immunocytochemistry for rapid and robust fine needle aspiration biopsy diagnosis." Diagnostic Pathology 20.1 (2025): 86. (Year: 2025).*

G. Litjens et al., "Deep learning as a tool for increased accuracy and efficiency of histopathological diagnosis," Scientific Reports, vol. 6, Article No. 26286 (2016).

N. Alsubaie, N. Trahearn, S. E. A. Raza, D. Snead, and N. M. Rajpoot (2017). Stain Deconvolution Using Statistical Analysis of Multi-Resolution Stain Colour Representation. PLoS One 12(1): e0169875.

X. Li and K. N. Plataniotis, "A Complete Color Normalization Approach to Histopathology Images Using Color Cues Computed from Saturation-Weighted Statistics," IEEE Transactions on Biomedical Engineering, vol. 62, No. 7, pp. 1862-1873, Jul. 2015.

P. Dave, S. Alahmari, D. Goldgof, L. O. Hall, H. Morera and P. R. Mouton, "An adaptive digital stain separation method for deep learning-based automatic cell profile counts," Journal of Neuroscience Methods, 354 (2021) 109102.

A. Lahiani, J. Gildenblat, I. Klaman, N. Navab and E. Klaiman, "Generalising multistain immunohistochemistry tissue segmentation using end-to-end colour deconvolution deep neural networks," IET Image Processing, 2019, vol. 13, issue 7, pp. 1066-1073.

* cited by examiner

Cellular count (f)

SYSTEMS AND METHODS FOR PREPROCESSING IMMUNOCYTOCHEMISTRY IMAGES FOR MACHINE LEARNING IMAGE-TO-IMAGE TRANSLATION

TECHNICAL FIELD

The present invention generally relates to machine learning image-to-image translation, and more particularly relates to systems and methods for preprocessing immunocytochemistry images for improved machine learning image-to-image translation accuracy.

BACKGROUND OF THE DISCLOSURE

Immunocytochemistry based canine fine needle aspiration (FNA) is commonly used to anatomically visualize the localization of a specific protein or antigen in cells by use of a specific primary antibody called a biomarker that binds to it. However, the large sized paired images (stained and unstained images each having an approximate size of five gigabytes (~5 GB)) have obtained formats that cannot be simply analyzed with machine learning and deep learning algorithms.

At present, deep learning algorithms take longer time to train with much complexity when it comes to paired images; in addition, localization and labelling requires too long time for tracking and annotating each cell. For meaningful machine learning, transformation of image pixels depicting cell features and morphology to features for analysis requires a well-defined pre-processing prior to machine learning where preprocessing is the transformation of raw features into data that a machine learning algorithm can understand and learn from.

Accordingly, there is a need for methods and systems for pre-processing of immunocytochemistry images for machine learning image-to-image translation which overcomes the drawbacks of prior systems and methods and provides simpler machine learning simpler with increased accuracy and decreased computation time. Furthermore, other desirable features and characteristics will become apparent from the subsequent detailed description and the appended claims, taken in conjunction with the accompanying drawings and this background of the disclosure.

SUMMARY

According to at least one aspect of the present embodiments, a method for pre-processing immunocytochemistry images for machine learning is provided. The method includes receiving paired positive and negative multi-protein images and segmenting stains of the paired multi-protein images. The method also includes labelling each image pixel corresponding to a cell of the paired multi-protein images and translating image pixel information of the labelled image pixels to tabular form to generate a table of cell coordinates and geometrical characteristics for each of the paired multi-protein images. The method further includes generating two cell-paired tables for each of the paired multi-protein images based on Euclidean distance-based pairing prior to input for the machine learning, where the Euclidean distance-based pairing is based on the cell coordinates in the table of cell coordinates and geometrical characteristics for each of the paired multi-protein images.

According to another aspect of the present embodiments, a system for pre-processing immunocytochemistry images for machine learning is provided. The system includes an image receiving module, an image segmentation module, a cell labelling module, a table-generating module, and a data output module. The image receiving module is configured to receive paired positive and negative multi-protein images and the image segmentation module is configured to segment stains of the paired multi-protein images. The cell labelling module is configured to label each image pixel of the paired multi-protein images corresponding to a cell of the paired multi-protein images and the table-generating module is configured to translate image pixel information of the labelled image pixels to tabular form to generate a table of cell coordinates and geometrical characteristics for each of the paired multi-protein images. And the data output module configured to generate two cell-paired tables for each of the paired multi-protein images based on Euclidean distance-based pairing as input for the machine learning, the Euclidean distance-based pairing being based on the cell coordinates in the table of cell coordinates and geometrical characteristics for each of the paired multi-protein images.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 2, comprising FIGS. 2A, 2B and 2C, depicts illustrations of separation of Hematoxylin-stained images and Eosin-stained images in accordance with the present embodiments, wherein FIG. 2A depicts well separation of the Hematoxylin-stained image, FIG. 2B depicts hue, saturation, value (HSV) split and red, green blue (RGB) split of the Eosin-stained image for designing a filter to pass the Eosin stain of the WG/PAX5 image, and FIG. 2C depicts well separation of the Eosin-stained image using the filter developed in accordance with FIG. 2B.

FIG. 3, comprising FIGS. 3A and 3B, depicts instance segmentation of one of the cropped WG images resulting in normalized and labelled images at different zoomed levels in accordance with the present embodiments, wherein FIG. 3A depicts normalized WG-H images at eight different zoomed levels and FIG. 3B depicts eight labelled images at corresponding zoomed levels.

FIG. 4, comprising FIGS. 4A to 4D, depicts cropped and labelled images with a cellular map and cellular count in accordance with the present embodiments, wherein FIG. 4A depicts a WG labelled image with its corresponding cell labels, FIG. 4B depicts a PAX5 labelled image with its corresponding cell labels, FIG. 4C depicts a cellular map of both, and FIG. 4D depicts a bar graph of the cell count.

Skilled artisans will appreciate that elements in the figures are illustrated for simplicity and clarity and have not necessarily been depicted to scale, and that the number in the graphs may have been normalized for simplicity and clarity.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of present embodiments to present unique systems and methods for pre-processing of immunocytochemistry images for machine learning image-to-image translation. The pre-processing systems and methods in accordance with the present embodiments provide improved robustness and accuracy over conventional methods and includes pre-processing for protein images, such as Wright-Giemsa (WG)-CD3/PAX5 images, which converts and simplifies the pixel information of each cell (even for cell count equal to or greater than four million) in tabular form with geometrical features. In addition, the pre-processing systems and methods in accordance with the present embodiments converts and simplifies the pixel information of each cell in the images with cellular alignment in a paired image dataset with a prediction accuracy greater than 90%, and up to 92%, and requiring extremely reduced minimum learning time for machine learning over deep learning algorithm, such as approximately ten seconds or up to a few minutes versus the convention pre-processing time of several days. Thus, the systems and methods in accordance with the present embodiments provide a pre-processing protocol which improves accuracy, reduces computation time and makes machine learning simplified and understandable.

The pre-processing of images in accordance with the present embodiments takes paired WG-CD3/PAX5 positive or negative images and performs normalization and separation of stains for labelling each cell based on Startdist's non-max separation (NMS) convolutional neural network (CNN). The labelled images' pixel information (i.e., the cell information) along with co-ordinates and geometrical features are translated to tabular form for pairing of CD3/PAX5 positive or negative cells based on minimum distance separation. The pre-processing in accordance with the present embodiments generates two cell-paired tables for each pair of WG-CD3/PAX5 image prior to input for machine learning.

Figure 1:
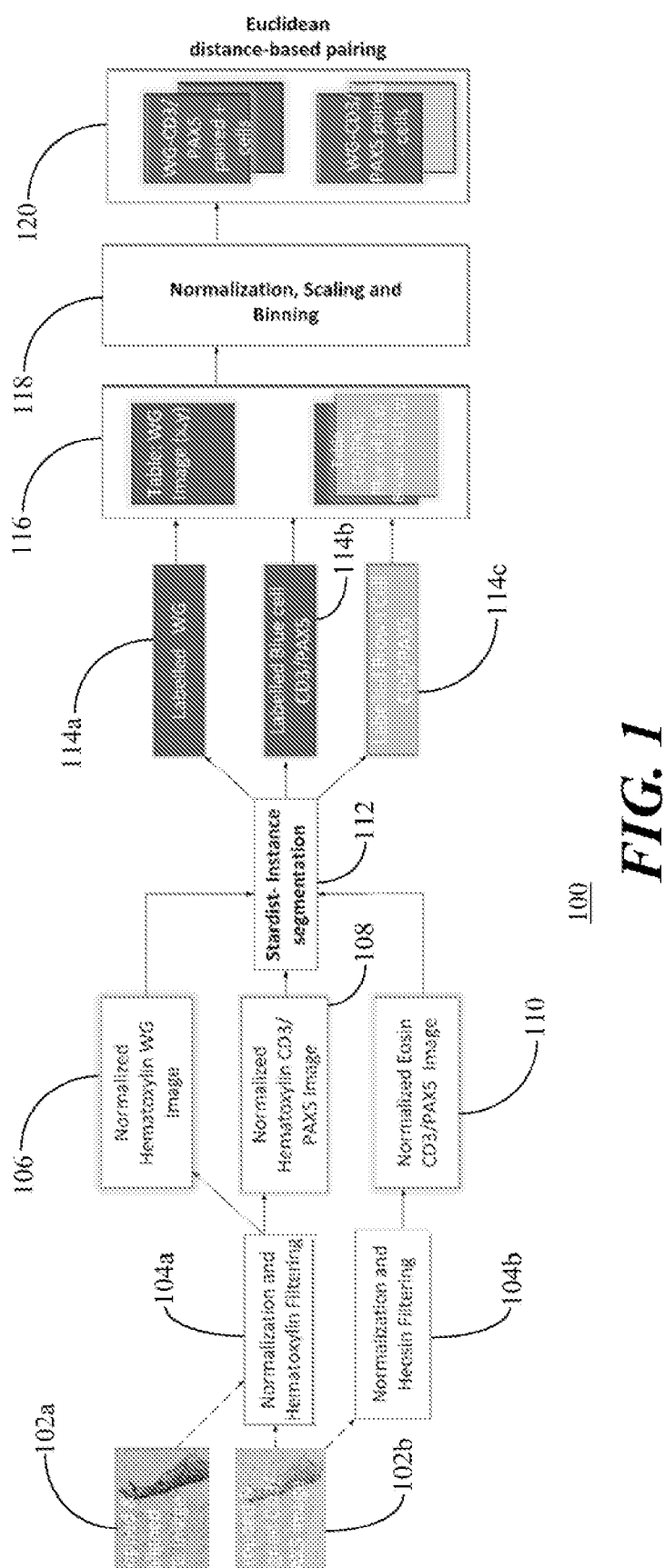
FIG. 1 depicts a diagram of a framework for an image pre-processing system in accordance with present embodiments.

Referring to FIG. 1, a diagram 100 illustrates the framework for an image pre-processing system in accordance with present embodiments. The framework in accordance with the present embodiments receives as input paired whole side images (WSI) with WG stained cells in an image as CD3 positive or negative (+/−) and PAX5 positive or negative (+/−). Then at crop and aligning steps 102a, 102b, processing includes cropping and image registration. The registered pairs are divided into WG-CD3/PAX5 positive or negative pairs. Then the registered pairs are normalized and filtered 104a, 104b for separating Hematoxylin and Eosin stains into a normalized Hematoxylin WG image 106, a normalized Hematoxylin CD3/PAX5 image 108, and a normalized Eosin CD3/PAX5 image 110. StarDist is a deep-learning-based method of 2D and 3D nucleus detection and segmentation of the images 106, 108, 110 is performed using StartDist's NMS convolutional neural network 112 and the cells are labelled WG cells 114a, labelled CD3/PAX5 Immuno-positive cells 114b and labelled CD3/PAX5 Immuno-negative cells 114c. With help of the Regionprops tool in Python, the cell counting, coordinates and their geometrical properties such as (area, orientation, major axis length, diameter, orientation, solidity, and mean intensities) are generated 116 in the form of tables (including the lower overlapping table) for paired WG-CD3/PAX5 labelled images. Each table is sorted based on area followed by normalization, scaling and binning 118. Once each table for paired WG-CD3/PAX5 is binned 118, then all cells have been paired from WG with their corresponding stained cell in CD3/PAX5 through minimum Euclidean separation 120, the pairing indicated by the overlapping tables. The pairing of cells from a paired WG-CD3/PAX5 image advantageously presents in accordance with the present embodiments a simplified form of possible tabular data for machine learning in accordance with only nine parameters (x coordinates, y-coordinates, area, axis major length, axis minor length, orientation, equivalent diameter, mean intensity, and solidity) of each counted cell for a desired analysis. Thus, the framework illustrated in the diagram 100 pre-processes the image information for machine learning image-to-image translation and advantageously makes learning, prediction, and classification easier for machine learning with adequate accuracy in less time of learning.

At the cropping steps 102a, 102b, the acquired data of whole slide images (WSI) that include WG paired with stained CD3/PAX5 with rough sizes of around five gigabytes (GBs) are cropped to lower dimensions so that each WG image is cropped 102a to a size of around two hundred megabytes (MBs) to two hundred fifty MBs and each paired CD3/PAX5 image is cropped 102b to a size of around two hundred megabytes to two hundred fifty megabytes. Each WSI image was cropped 102a, 102b in accordance with the normalization and labelling limits of the StartDist algorithm by keeping the size of the WSI (in GBs) divided by the number of cropped images less than or equal to roughly 200 MBs to 250 MBs. For example, if the image size of the WG image is 2 GBs paired with an image size of the CD3/PAX5 image of 1.5 GB, then keeping WG is standard and the paired images are cropped to 20 images with PNG format. QuPath software was used to read the raw NDPI scanned WSI.

As discussed hereinabove, the cropping steps 102a, 102b also included cellular alignment. The cellular alignment is for image registration and a first pass image registration was adapted using PTGui software along with Python to align the cropped WG image paired with the stained CD3/PAX5 cropped image using a scale-invariant feature transform (SIFT) algorithm. To achieve this, fifteen to twenty-five cellular co-ordinates were selected from each paired image that share properties like edging, scaling, rotation, and translation.

Figure 2A:
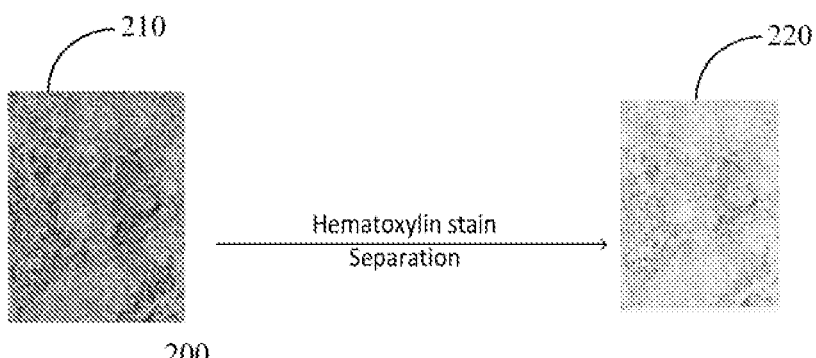

Prior to image annotation using StartDist 112, each image pair is advantageously normalized and filtered 104a, 104b prior to color separation for nuclei segmentation to enable improved quantitative analysis. Referring to FIG. 2A, an illustration 200 depicts the Hematoxylin (H) stained image being filtered 104a from the normalized WG/CD3/PAX5 image 210 using conventional methods to derive the well separated image 220 to derive the normalized hematoxylin WG image 106 and the normalized hematoxylin CD3/PAX5 image 108. It should be noted that the Hematoxylin stain helps to separate the blue cell from WG image.

Figure 2B:
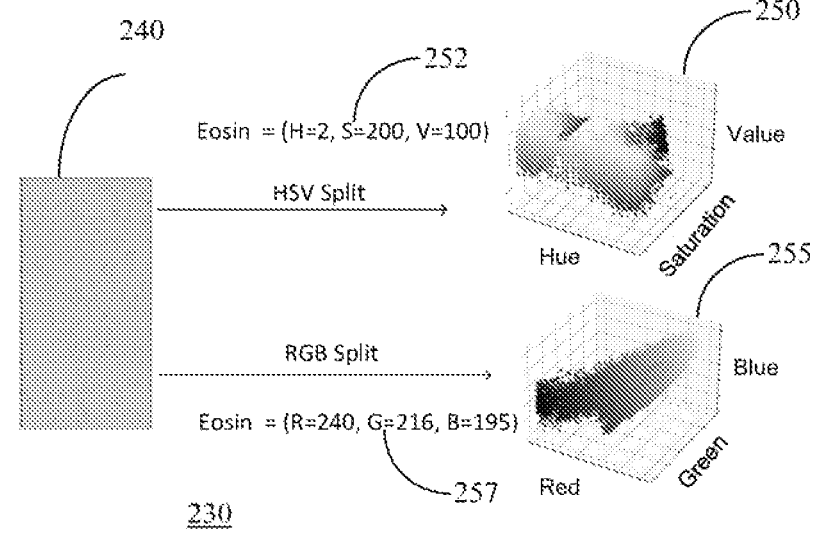
Figure 2C:
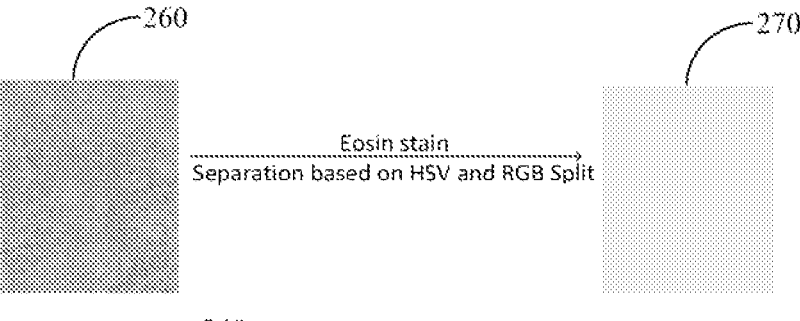

However, the Eosin (E) stained image is separated 104b from the CD3/PAX5 image 240 using hue, saturation, value (HSV) split 250 and red, green blue (RGB) split 255 as shown in the diagram 230 of FIG. 2B. The split values of HSV 252 that have been extracted and the split values of RGB 257 that have been extracted are shown in the diagram 230. Based on the split values of HSV 252 and the split values of RGB 257, a filter was designed which adequately separates the eosin stain 270 from the CD3/PAX5 image 260 as shown in the diagram 260 of FIG. 2C.

The framework in accordance with the present embodiments performs instance segmentation 112 using StartDist for cell detection. StartDist employs trained per-pixel cell segmentation with subsequent pixel grouping of subsequent shape refinement. To avoid any error in cross boundary or diffused segment of cells, the framework 100 in accordance with the present embodiments localizes cell nuclei via star-convex polygons using StarDist's non-max separation (NMS) convolutional neural network (CNN) that predicts for every pixel a polygon for the cell instance at that position and plausible shape. NMS CNN then labels and counts the conflicting objects irrespective of color and separates them based on thresholding. By separating the color information of the images, the cells can be counted and labelled and various quantitative analysis can be performed. The image 220 in FIG. 2A depicts instance segmentation of one of the cropped WG images in accordance with the present embodiments.

Figure 3A:
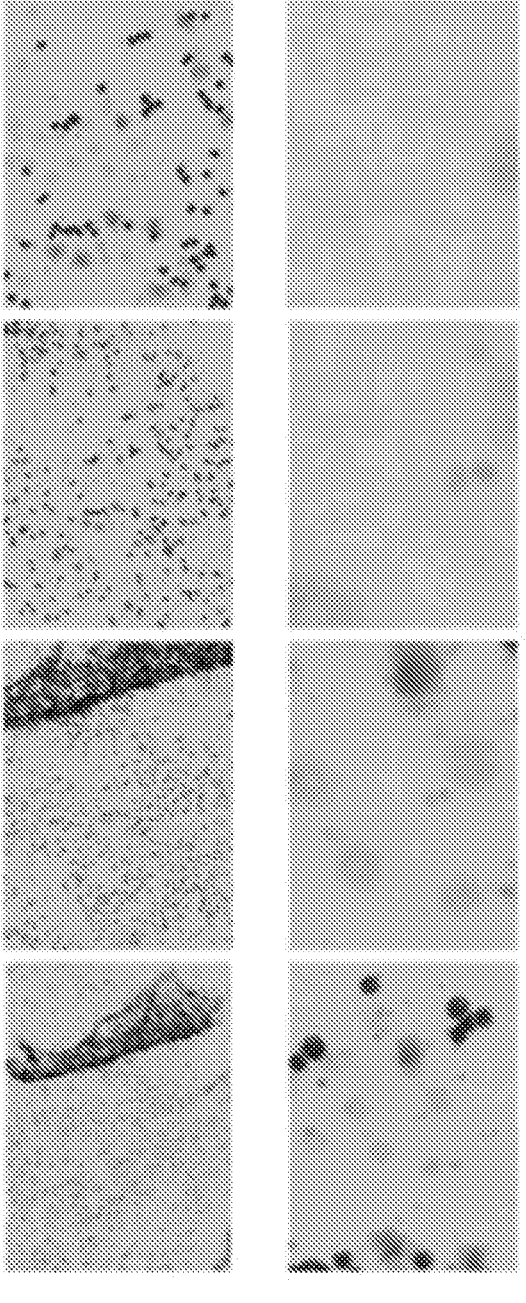
Figure 3B:
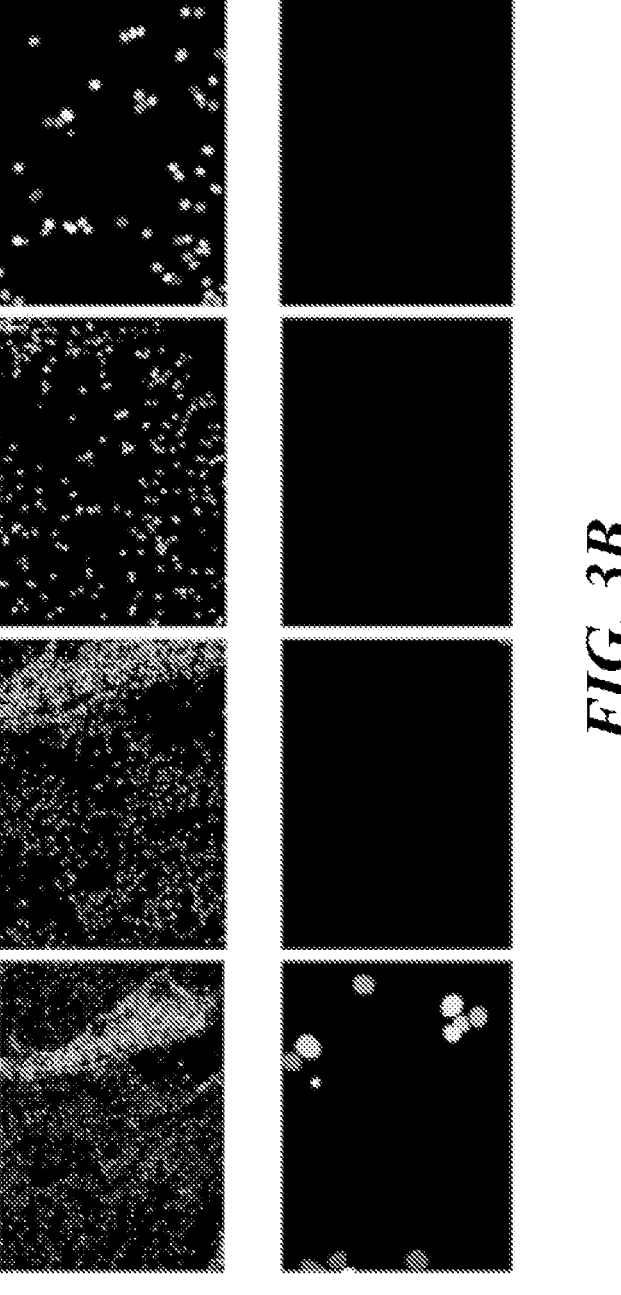

After instance segmentation 112 of the images, the images are labelled 114a, 114b, 114c (FIG. 1). The labelled information is then extracted using Regionprops. Regionprops is an image processing function that computes various properties of regions of pixels in an image and thereby measures a set of properties for each labelled region in a label matrix or an image. Referring to FIGS. 3A and 3B, FIG. 3A depicts normalized WG-H images at eight different zoomed levels and FIG. 3B depicts eight labelled images at corresponding zoomed levels. In the first panel of FIG. 3A, one can notice there are "n" number of regions whose centroids, coordinates, area, diameter, major axis length, minor axis length, mean intensity of pixel and solidity can be easily measured. Therefore, one can generate and extract a list or a table with such information. In accordance with the present embodiments, information of cell coordinates and geometrical characteristics such as x-coordinates, y-coordinates, area, axis major length, axis minor length, orientation, equivalent diameter, mean intensity, and solidity of each labelled cell or region for the registered paired WG-CD3/PAX5 image is generated and extracted into tables 116 (FIG. 1). Table 1 is an exemplary generated table of cell coordinates and geometrical characteristics for the WG image of FIG. 3A.

cells and when segmented 112, the immuno-positive cells are labelled 114b and the immuno-negative cells are labelled 114c. Both cells 114b and 114c in the CD3/PAX5 image belong to the original WG image.

Figure 5:
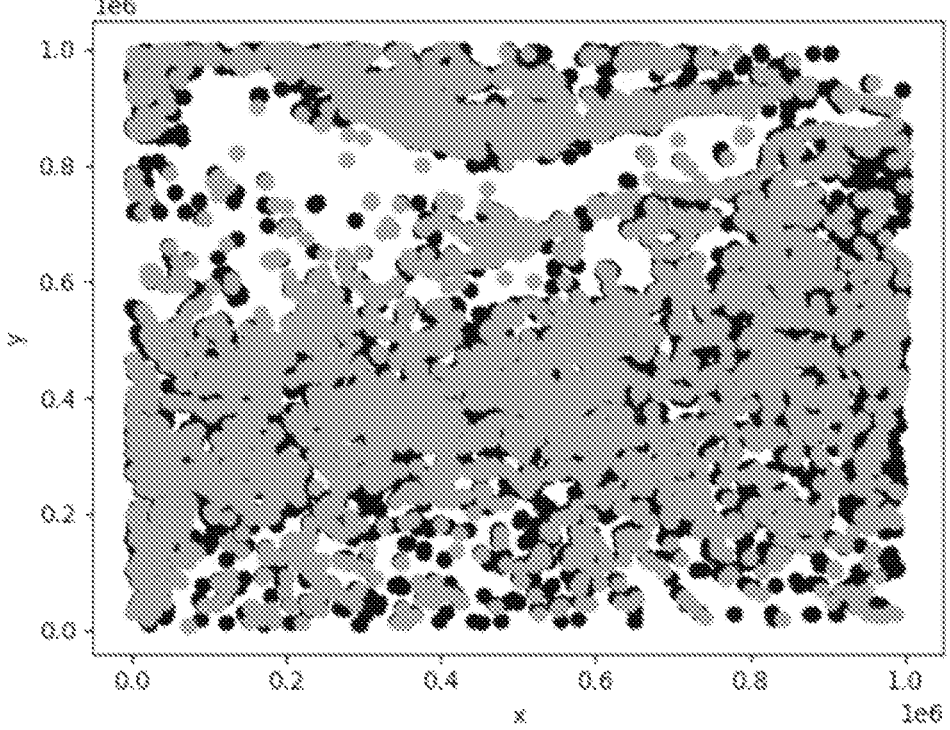
FIG. 5 depicts a normalized, scaled and rounded off scatter plot of WG immune-cells and CD3-immuno-positive cells in accordance with the present embodiments.

As part of the normalization, scaling and binning 118, the labelled features are normalized in that each cells' geometrical properties from the Regionprops-generated tables 116 are normalized in their respective column/matrix with min/max normalization. Scaling can, for example, scale the values to six-digit integer values prior to rounding off. Prior to pairing of immuno-positive and immuno-negative cells using their respective coordinates (x,y) 120, rounding off along with binning is performed using a Python script. FIG. 5 depicts a normalized, scaled and rounded off scatter plot of WG immune-cells in black and CD3-immuno-positive in gray.

A binned matrix is defined for each (x,y) coordinates of the WG-CD3/PAX5 paired immuno-positive cells and the WG-CD3/PAX5 paired immuno-negative cells with bin size of fifty units. Then, each binned matrix is labelled to a binned label matrix.

Following rounding and binning 118, cells from the WG image paired with the stained CD3/PAX5 image are paired by finding the center coordinates with smallest Euclidean separation in the paired images. Prior to pairing, sorting is performed based on the x values of the WG cells and the immuno-positive/negative cells of cropped the CD3/PAX5 image.

After sorting, a script with a condition of finding cells in the proximity (x1, y1) of cells in the WG image with corresponding immune positive/negative cells in the approximate location of the CD3/PAX5 image is formulated using Euclidean distance separation for pairing. For example, the first row of the binned labelled WG image (x1, y1) is compared with all rows of the binned and labelled (x2, y2) CD3/PAX5 image. This creates a distance matrix of nxn dimensions with distance information from each cell in the WG image to that of each cell in the CD3/PAX5 image.

TABLE 1

| label | x1 | y1 | area | equivalent_diameter | mean_intensity | solidity |
|---|---|---|---|---|---|---|
| 1 | 1572.241915 | 4293.429495 | 2319 | 54.338223 | 116.724450 | 0.979307 |
| 2 | 3206.334807 | 9831.170016 | 2488 | 56.283390 | 127.234727 | 0.977603 |
| 3 | 9738.976842 | 10023.875370 | 2375 | 54.990398 | 98.668632 | 0.979381 |
| 4 | 983.006436 | 3173.770919 | 3418 | 65.969180 | 118.709479 | 0.983597 |
| 5 | 1963.540326 | 798.415373 | 2641 | 57.988151 | 103.094283 | 0.982881 |

Figure 4A:
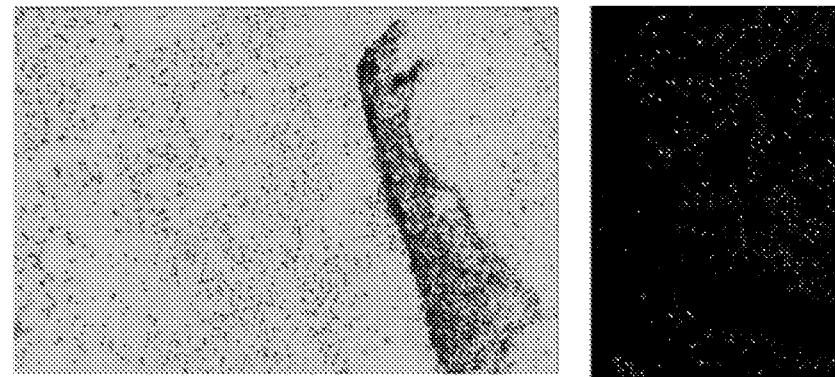
Figure 4B:
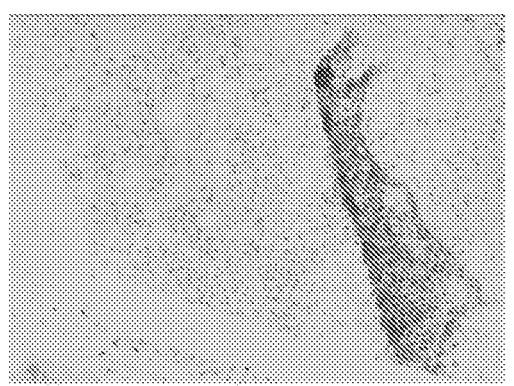
Figure 4B:
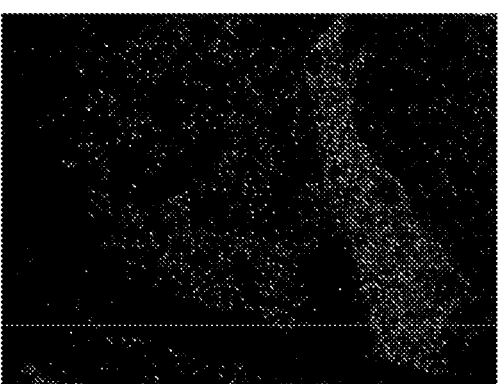
Figure 4C:
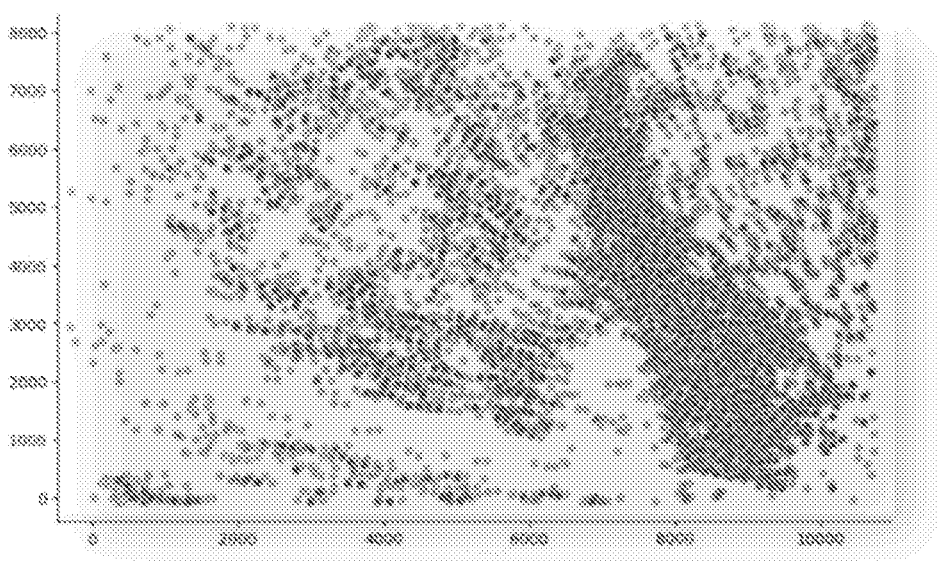
Figure 4D:
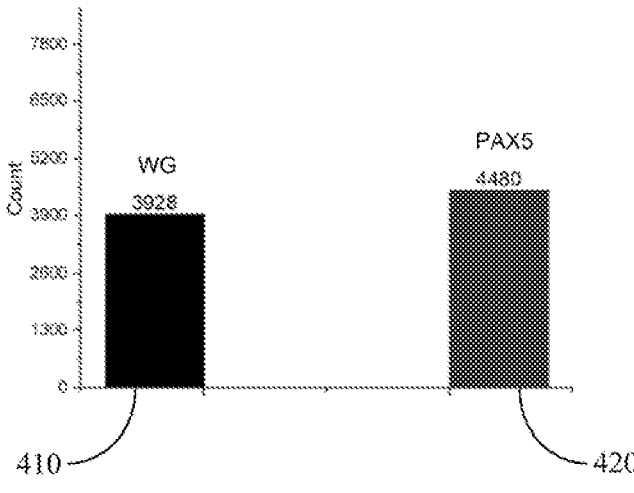

After generating the labelled information 114a, 114b, 114c, cell counting can be performed along with different analysis. Referring to FIGS. 4A to 4D, cropped and labelled images with a cellular map and cellular count in accordance with the present embodiments is depicted. FIG. 4A depicts a WG labelled image with its corresponding cell labels and FIG. 4B depicts a PAX5 labelled image with its corresponding cell labels. FIG. 4C depicts a cellular map of both, while FIG. 4D depicts a bar graph of the cell count, where the bar 410 is the cell count of the WG labelled image and the bar 420 is the cell count of the PAX5 labelled image. So, after generating the labelled information 114a, 114b, 114c, the cellular map (x,y) along with cell count can be generated as shown in FIGS. 4C and 4D. These cells of the WG labelled image and the PAX5 labelled image can later be classified as Immuno-positive and Immuno-negative cells.

Each WG image when stained with CD3/PAX5 is stained with information of immuno-positive and immuno-negative From this matrix, WG cells are paired with CD3/PAX5 cells based on the minimum distance between cells. Finally, a table is generated with WG cells paired with CD3/PAX5 cells and are labelled with binary labels (1 or 0). Immuno-negatives are marked as 0 and immuno-positives are marked as 1.

Preprocessing of immunocytochemistry stains for improved machine learning accuracy in accordance with the present embodiments involves normalization, stain separation, cell labeling based on non-max separation CNN, and segmentation methods and can be in artificial intelligence assisted pathology. For example, the pre-processing in accordance with the present embodiments can be advantageously applied to artificial intelligence assisted pathology in early diagnoses of suspected cancer where cancerous cells are typically identified through biomarkers such as Hematoxylin and Eosin-stained cells prior to machine learning. More broadly, the pre-processing in accordance with the present embodiments can advantageously be utilized in cytopathology, immunocytochemistry, stain separation through digital filtering, and localization of cells.

One application wherein the global veterinary community will benefit from the pre-processing systems and methods in accordance with the present embodiments is for immunocytochemistry image analysis for canine lymphoma. This will assist fine needle aspiration (FNA) procedures by reducing diagnosis time and will translate image data into tabular form for clinical advice. Further, medical, veterinary, scientific, and engineering personnel will benefit from training in AI research and development for their respective objectives and analysis by using the systems and methods in accordance with the present embodiments. In the future, the systems and methods in accordance with the present embodiments will assist diagnosing lymphoma when made available to help diagnostic laboratories thereby improving diagnostic accuracy and improving quality of life of cancer patient.

Thus, it can be seen that the methods and systems in accordance with the present embodiments provide a novel and efficient pre-processing of image information for machine learning image-to-image translation which makes the machine learning simpler, quicker and more efficient. The methods and systems in accordance with the present embodiments improves accuracy of machine learning of translated images, reduces the machine learning computation time and makes the machine learning simple and understandable. At present, deep learning algorithms take a long time to train and have great complexity when applied to localization and labelling of paired images of stained cells and such training requires too much time to track and annotate each cell. For meaningful machine learning, transformation of image pixel information of cell features and morphology to features requires a well-defined pre-processing prior to machine learning. Preprocessing is the transformation of raw features into data that a machine learning algorithm can understand and learn from. This pre-processing doesn't only make learning simpler but also comes with better accuracy and less computation time. Pre-processing in accordance with the present embodiments for multi-protein images, such as WG-CD3/PAX5 images, converts and simplifies the pixel information of each cell (which can be a cell count as great four million cells) in tabular form having geometrical features with cellular alignment in the paired image dataset with prediction accuracy of 92% and minimum learning time for machine learning approximately ten seconds up to a few minutes as opposed to deep learning algorithm with conventional pre-processing taking several days.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A method for pre-processing immunocytochemistry images for machine learning, the method comprising:

receiving paired positive and negative multi-protein images;

segmenting stains of the paired multi-protein images;

labelling each image pixel corresponding to a cell of the paired multi-protein images;

translating image pixel information of the labelled image pixels to tabular form to generate a table of cell coordinates and geometrical characteristics for each of the paired multi-protein images; and generating two cell-paired tables for each of the paired multi-protein images based on Euclidean distance-based pairing prior to input for the machine learning, wherein the Euclidean distance-based pairing is based on the cell coordinates in the table of cell coordinates and geometrical characteristics for each of the paired multi-protein images.

2. The method in accordance with claim 1 wherein the paired multi-protein images comprise paired WG-CD3/PAX5 images.

3. The method in accordance with claim 1 further comprising staining the received paired multi-protein images with Hematoxylin and/or Eosin before segmentation.

4. The method in accordance with claim 3 further comprising normalizing the stains of the paired multi-protein images before segmentation.

5. The method in accordance with claim 1 wherein the segmentation comprises instance segmentation of the stains of the paired multi-protein images utilizing nucleus detection.

6. The method in accordance with claim 5 wherein the instance segmentation of the stains of the paired multi-protein images utilizing nucleus detection comprises separation of stains utilizing StarDist non-max separation convolutional neural network.

7. The method in accordance with claim 1 further comprising binning the cells of the paired multi-protein images based on the cell coordinates in the table of cell coordinates and geometrical characteristics for each of the paired multi-protein images.

8. The method in accordance with claim 7 wherein binning the cells of the paired multi-protein images based on the cell coordinates comprises:

defining a binned matrix comprising a plurality of bins based upon the cell coordinates; and binning each of the cells into one of the plurality of bins in response to the cell coordinates.

9. The method in accordance with claim 1 wherein the Euclidean distance-based pairing comprises pairing corresponding cells in each of the paired multi-protein images based on minimum Euclidean separation.

10. The method in accordance with claim 1 wherein receiving the paired positive and negative multi-protein images comprises receiving whole side images of multiple protein cells and cropping the whole side images to generate the paired positive and negative multi-protein images.

11. A system for pre-processing immunocytochemistry images for machine learning, the system comprising:

an image receiving module configured to receive paired positive and negative multi-protein images;

an image segmentation module configured to segment stains of the paired multi-protein images;

a cell labelling module configured to label each image pixel of the paired multi-protein images corresponding to a cell of the paired multi-protein images;

a table-generating module configured to translate image pixel information of the labelled image pixels to tabular form to generate a table of cell coordinates and geometrical characteristics for each of the paired multi-protein images; and a data output module configured to generate two cell-paired tables for each of the paired multi-protein images based on Euclidean distance-based pairing as input for the machine learning, wherein the Euclidean distance-based pairing is based on the cell coordinates in the table of cell coordinates and geometrical characteristics for each of the paired multi-protein images.

12. The system in accordance with claim 11 wherein the paired multi-protein images comprise paired WG-CD3/PAX5 images.

13. The system in accordance with claim 11 further comprising a cell staining module configured to stain the received paired multi-protein images with Hematoxylin and/or Eosin, wherein the cell staining module is coupled to the image segmentation module to provide the stained images thereto.

14. The system in accordance with claim 13 wherein the cell staining module is further configured to normalize the stains of the paired multi-protein images before provide the stained images to the segmentation module.

15. The system in accordance with claim 11 wherein the segmentation module performs instance segmentation of the stains of the paired multi-protein images utilizing nucleus detection.

16. The system in accordance with claim 15 wherein the segmentation module performs instance segmentation of the stains of the paired multi-protein images utilizing nucleus detection by separation of stains utilizing StarDist non-max separation convolutional neural network.

17. The system in accordance with claim 11 further comprising a binning module configured to bin the cells of the paired multi-protein images based on the cell coordinates in the table of cell coordinates and geometrical characteristics for each of the paired multi-protein images.

18. The system in accordance with claim 17 wherein the bin module is configured to bin the cells of the paired multi-protein images based on the cell coordinates by defining a binned matrix comprising a plurality of bins based upon the cell coordinates and binning each of the cells into one of the plurality of bins in response to the cell coordinates.

19. The system in accordance with claim 11 wherein the Euclidean distance-based pairing comprises pairing corresponding cells in each of the paired multi-protein images based on minimum Euclidean separation.

20. The system in accordance with claim 11 wherein the image receiving module is configured to receive whole side images of multiple protein cells and crop the whole side images to generate the paired positive and negative multi-protein images.

* * * * *